United States Patent
Keith, Jr. et al.

(10) Patent No.: US 12,073,378 B2
(45) Date of Patent: Aug. 27, 2024

(54) METHOD AND APPARATUS FOR ELECTRONIC TRANSACTIONS USING PERSONAL COMPUTING DEVICES AND PROXY SERVICES

(71) Applicant: WINKK, INC, Menlo Park, CA (US)

(72) Inventors: Robert O. Keith, Jr., San Jose, CA (US); Bradley E. Gray, Palo Alto, CA (US)

(73) Assignee: Winkk, Inc., Menlo Park, CA (US)

(*) Notice: Subject to any disclaimer, the term of this patent is extended or adjusted under 35 U.S.C. 154(b) by 0 days.

(21) Appl. No.: 16/709,771

(22) Filed: Dec. 10, 2019

(65) Prior Publication Data

US 2021/0174333 A1    Jun. 10, 2021

(51) Int. Cl.
*G06Q 20/32* (2012.01)
*G06Q 20/38* (2012.01)
*H04L 9/40* (2022.01)

(52) U.S. Cl.
CPC ..... *G06Q 20/3276* (2013.01); *G06Q 20/3274* (2013.01); *G06Q 20/3823* (2013.01); *H04L 63/0281* (2013.01); *H04L 2463/082* (2013.01)

(58) Field of Classification Search
CPC . G06Q 20/3276; G06Q 20/3274; G06Q 20/32
See application file for complete search history.

(56) References Cited

U.S. PATENT DOCUMENTS

| | | | |
|---|---|---|---|
| 6,947,943 B2 | 9/2005 | DeAnna | |
| 7,468,927 B1 | 12/2008 | Battista | |
| 7,571,320 B2 | 8/2009 | Davis | |
| D607,009 S | 12/2009 | McEnaney | |
| D614,192 S | 4/2010 | Takano | |
| 7,885,635 B2 * | 2/2011 | Laursen | H04L 67/14 455/403 |
| 7,925,013 B1 | 4/2011 | Washington | |
| 7,992,102 B1 | 8/2011 | De Angelo | |
| 7,992,190 B2 | 8/2011 | Mevissen | |
| 8,139,581 B1 | 3/2012 | Mraz | |
| 8,218,762 B2 | 7/2012 | Itoh | |
| 8,363,259 B2 | 1/2013 | Gilboa | |
| 8,417,642 B2 * | 4/2013 | Oren | G06Q 30/06 705/64 |

(Continued)

FOREIGN PATENT DOCUMENTS

| | | | |
|---|---|---|---|
| CN | 107924475 A | 4/2018 | |
| CN | 106413128 B | 7/2020 | |

(Continued)

OTHER PUBLICATIONS

Erdem Alkim et al., "Post-Quantum key exchange—a new hope", International Association for Cryptologic Research, vol. 20161116:063839, Nov. 16, 2016, pp. 1-22.

(Continued)

*Primary Examiner* — Daniel S Felten

(74) *Attorney, Agent, or Firm* — Haverstock & Owens, A Law Corporation

(57) ABSTRACT

A security platform architecture is described herein. The security platform architecture includes multiple layers and utilizes a combination of encryption and other security features to generate a secure environment.

17 Claims, 10 Drawing Sheets

(56) References Cited

U.S. PATENT DOCUMENTS

| | | | |
|---|---|---|---|
| 8,417,643 B2* | 4/2013 | Mardikar | G06Q 20/3829 |
| | | | 713/185 |
| 8,543,834 B1 | 9/2013 | Barra | |
| 8,543,884 B2 | 9/2013 | Mansour | |
| 8,621,209 B1 | 12/2013 | Johansson | |
| 8,639,785 B2* | 1/2014 | Kiley | G06F 16/9535 |
| | | | 709/228 |
| 8,892,871 B2* | 11/2014 | Cho | H04L 9/3263 |
| | | | 713/156 |
| D719,176 S | 12/2014 | Cohen | |
| D719,177 S | 12/2014 | Cohen | |
| D723,050 S | 2/2015 | Minsung et al. | |
| 9,112,835 B2 | 8/2015 | Isozaki | |
| 9,210,156 B1 | 12/2015 | Little | |
| 9,219,732 B2* | 12/2015 | Baghdasaryan | H04L 63/0861 |
| 9,225,695 B1 | 12/2015 | Riera | |
| 9,350,539 B2 | 5/2016 | Veugen | |
| 9,392,460 B1 | 7/2016 | Blake | |
| 9,419,951 B1* | 8/2016 | Felsher | H04L 9/0841 |
| D765,669 S | 9/2016 | Shaw | |
| 9,615,066 B1 | 4/2017 | Tran | |
| 9,665,169 B1 | 5/2017 | Dai | |
| 9,706,406 B1 | 7/2017 | Adams | |
| D800,764 S | 10/2017 | Thoreson | |
| 9,852,418 B2* | 12/2017 | Mardikar | H04W 12/069 |
| D813,884 S | 3/2018 | Penker | |
| 9,959,694 B2* | 5/2018 | Lindsay | G06F 21/31 |
| 9,961,547 B1 | 5/2018 | Molina-Markham | |
| 10,019,561 B1 | 7/2018 | Shelton | |
| 10,200,364 B1 | 2/2019 | Ketharaju et al. | |
| D847,857 S | 5/2019 | Elatta | |
| 10,374,800 B1 | 8/2019 | Sharfi | |
| 10,402,800 B2 | 9/2019 | Lucas | |
| 10,404,458 B1 | 9/2019 | Yamada | |
| 10,430,789 B1 | 10/2019 | Herald, Jr. | |
| 10,432,605 B1 | 10/2019 | Lester | |
| 10,437,975 B1 | 10/2019 | Shelton | |
| 10,521,223 B1 | 12/2019 | Bogushefsky, III | |
| 10,630,467 B1 | 4/2020 | Gilbert | |
| 10,674,446 B1 | 6/2020 | Trent | |
| 10,769,633 B2* | 9/2020 | Dua | G06Q 20/401 |
| 10,810,290 B2* | 10/2020 | Minter | G06F 21/64 |
| 10,867,021 B1 | 12/2020 | Shelton | |
| 10,887,307 B1 | 1/2021 | Newstadt | |
| 10,911,425 B1 | 2/2021 | Hitchcock | |
| D916,890 S | 4/2021 | Nagpal | |
| 10,970,607 B2 | 4/2021 | Xue | |
| 11,005,839 B1 | 5/2021 | Shahidzadeh | |
| 11,030,618 B1* | 6/2021 | Budko | G06Q 20/40145 |
| 11,038,694 B1 | 6/2021 | Kleinman | |
| D925,602 S | 7/2021 | Xu | |
| D928,803 S | 8/2021 | Faller | |
| D928,820 S | 8/2021 | Bodduluri | |
| 11,121,878 B2 | 9/2021 | McCarty | |
| D942,469 S | 2/2022 | Abdullah et al. | |
| 11,283,835 B1 | 3/2022 | Gordon | |
| 11,328,042 B2 | 5/2022 | Keith, Jr. | |
| 11,510,172 B1 | 11/2022 | Feng | |
| 11,553,337 B2 | 1/2023 | Keith, Jr. | |
| 11,563,582 B2 | 1/2023 | Keith, Jr. | |
| 11,574,045 B2 | 2/2023 | Keith, Jr. | |
| 11,588,794 B2 | 2/2023 | Keith, Jr. | |
| 11,637,694 B2 | 4/2023 | Islamov | |
| 11,640,602 B2* | 5/2023 | Budko | G06Q 20/3263 |
| | | | 705/67 |
| 11,652,815 B2 | 5/2023 | Keith, Jr. | |
| 11,657,140 B2 | 5/2023 | Keith, Jr. | |
| 2002/0099955 A1 | 7/2002 | Peled | |
| 2002/0114454 A1 | 8/2002 | Hamilton | |
| 2002/0131592 A1 | 9/2002 | Hinnant | |
| 2002/0169871 A1 | 11/2002 | Cravo de Almeida | |
| 2003/0014750 A1 | 1/2003 | Kamen | |
| 2003/0016844 A1 | 1/2003 | Numaoka | |
| 2003/0021416 A1 | 1/2003 | Brown | |
| 2003/0147267 A1 | 8/2003 | Huttunen | |
| 2003/0174067 A1 | 9/2003 | Soliman | |
| 2003/0221030 A1 | 11/2003 | Pontius | |
| 2004/0223616 A1 | 11/2004 | Kocarev | |
| 2005/0135609 A1 | 6/2005 | Lee | |
| 2005/0147240 A1 | 7/2005 | Agrawal | |
| 2006/0075060 A1 | 4/2006 | Clark | |
| 2006/0031301 A1 | 9/2006 | Herz et al. | |
| 2006/0196950 A1 | 9/2006 | Kiliccote | |
| 2006/0236408 A1 | 10/2006 | Yan | |
| 2006/0285544 A1 | 12/2006 | Taylor | |
| 2008/0022141 A1 | 1/2008 | Hammarlund | |
| 2008/0031460 A1 | 2/2008 | Brookner | |
| 2008/0045218 A1 | 2/2008 | Okochi | |
| 2008/0165937 A1 | 7/2008 | Moore | |
| 2008/0301057 A1 | 12/2008 | Oren | |
| 2009/0006796 A1 | 1/2009 | Chang | |
| 2009/0161873 A1 | 6/2009 | Simard | |
| 2009/0194592 A1 | 8/2009 | Ming et al. | |
| 2009/0315671 A1 | 12/2009 | Gocho | |
| 2009/0327746 A1 | 12/2009 | Greco | |
| 2010/0079591 A1 | 4/2010 | Lee | |
| 2010/0100716 A1 | 5/2010 | Scott | |
| 2010/0122274 A1 | 5/2010 | Gillies | |
| 2010/0329232 A1 | 12/2010 | Tubb | |
| 2011/0072142 A1 | 3/2011 | Herz et al. | |
| 2011/0106935 A1 | 5/2011 | Srinivasan | |
| 2011/0167255 A1 | 7/2011 | Matzkel | |
| 2011/0187642 A1* | 8/2011 | Faith | G06Q 20/32 |
| | | | 345/158 |
| 2011/0194694 A1 | 8/2011 | Struik | |
| 2011/0233284 A1 | 9/2011 | Howard | |
| 2011/0302405 A1 | 12/2011 | Marlow | |
| 2011/0321052 A1 | 12/2011 | Long | |
| 2012/0214442 A1 | 8/2012 | Crawford | |
| 2012/0221859 A1 | 8/2012 | Marien | |
| 2012/0272058 A1 | 10/2012 | Wang et al. | |
| 2012/0281885 A1 | 11/2012 | Syrdal | |
| 2013/0086625 A1 | 4/2013 | Driscoll | |
| 2013/0111208 A1 | 5/2013 | Sabin | |
| 2013/0202104 A1 | 8/2013 | Ghouti | |
| 2013/0205410 A1 | 8/2013 | Sambamurthy | |
| 2013/0239191 A1 | 9/2013 | Bostick | |
| 2013/0243187 A1 | 9/2013 | Hortsmeyer | |
| 2014/0038583 A1 | 2/2014 | Berg | |
| 2014/0039892 A1 | 2/2014 | Mills | |
| 2014/0040628 A1 | 2/2014 | Fort | |
| 2014/0064166 A1 | 3/2014 | HomChadhuri | |
| 2014/0098723 A1 | 4/2014 | Battista | |
| 2014/0108803 A1 | 4/2014 | Probert | |
| 2014/0201531 A1 | 7/2014 | Toy | |
| 2014/0244514 A1* | 8/2014 | Rodriguez | G06Q 20/3223 |
| | | | 705/71 |
| 2014/0244515 A1 | 8/2014 | Garfinkle | |
| 2014/0278077 A1 | 9/2014 | Levin | |
| 2014/0304371 A1 | 10/2014 | Mraz | |
| 2014/0351618 A1 | 11/2014 | Connell | |
| 2014/0368601 A1 | 12/2014 | deCharms | |
| 2015/0089568 A1 | 3/2015 | Sprague | |
| 2015/0095580 A1 | 4/2015 | Liu | |
| 2015/0142666 A1 | 5/2015 | Landrok | |
| 2015/0242601 A1 | 8/2015 | Griffiths | |
| 2015/0242605 A1 | 8/2015 | Du | |
| 2015/0271679 A1 | 9/2015 | Park | |
| 2015/0278805 A1* | 10/2015 | Spencer, III | G06Q 20/3278 |
| | | | 705/44 |
| 2015/0280911 A1 | 10/2015 | Andoni | |
| 2015/0294092 A1 | 10/2015 | Balasubramanian | |
| 2015/0347734 A1 | 12/2015 | Beigi | |
| 2015/0356289 A1 | 12/2015 | Brown | |
| 2015/0365229 A1 | 12/2015 | Patey | |
| 2015/0365235 A1 | 12/2015 | Hostyn | |
| 2015/0370826 A1 | 12/2015 | Mraz | |
| 2015/0373007 A1 | 12/2015 | Sheller | |
| 2016/0007288 A1 | 1/2016 | Samardzija | |
| 2016/0011224 A1 | 1/2016 | Pollack | |
| 2016/0057623 A1 | 2/2016 | Dutt | |
| 2016/0065558 A1 | 3/2016 | Suresh | |
| 2016/0065570 A1 | 3/2016 | Spencer | |
| 2016/0098334 A1 | 4/2016 | Harihharakrishnan | |

(56) References Cited

U.S. PATENT DOCUMENTS

| | | |
|---|---|---|
| 2016/0110528 A1 | 4/2016 | Gupta |
| 2016/0117673 A1 | 4/2016 | Landrock |
| 2016/0135107 A1 | 5/2016 | Hampel |
| 2016/0180078 A1 | 6/2016 | Chhabra |
| 2016/0182503 A1 | 6/2016 | Cheng |
| 2016/0227411 A1 | 8/2016 | Lundblade |
| 2016/0239649 A1 | 8/2016 | Zhao |
| 2016/0239657 A1 | 8/2016 | Loughlin-Mchugh |
| 2016/0283406 A1 | 9/2016 | Linga |
| 2016/0320831 A1 | 11/2016 | McCubbin |
| 2016/0342873 A1 | 11/2016 | Feld et al. |
| 2017/0005995 A1 | 1/2017 | Yang |
| 2017/0013453 A1 | 1/2017 | Lee |
| 2017/0041309 A1* | 2/2017 | Ekambaram ............ G06F 21/44 |
| 2017/0048062 A1 | 2/2017 | Polak |
| 2017/0063528 A1 | 3/2017 | Seo |
| 2017/0070340 A1 | 3/2017 | Hibshoosh |
| 2017/0070890 A1 | 3/2017 | Luff |
| 2017/0085382 A1 | 3/2017 | Kamakari |
| 2017/0124385 A1 | 5/2017 | Ganong |
| 2017/0147345 A1 | 5/2017 | Clevenger |
| 2017/0193211 A1 | 7/2017 | Blake |
| 2017/0220407 A1 | 8/2017 | Estrada |
| 2017/0230172 A1 | 8/2017 | Andersson |
| 2017/0264597 A1 | 9/2017 | Pizot |
| 2017/0272419 A1 | 9/2017 | Kumar |
| 2017/0289168 A1 | 10/2017 | Bar |
| 2017/0295010 A1 | 10/2017 | Shibutani |
| 2017/0311250 A1 | 10/2017 | Rico Alvarino |
| 2017/0317823 A1 | 11/2017 | Gandhi |
| 2017/0339118 A1 | 11/2017 | Hwang |
| 2018/0005239 A1* | 1/2018 | Schlesinger ............ G09C 5/00 |
| 2018/0007530 A1 | 1/2018 | Tanaka |
| 2018/0012003 A1 | 1/2018 | Asulin |
| 2018/0025135 A1 | 1/2018 | Odom |
| 2018/0029560 A1 | 2/2018 | Mohaupt |
| 2018/0039990 A1 | 2/2018 | Lindemann |
| 2018/0063784 A1 | 3/2018 | Abraham |
| 2018/0109696 A1 | 4/2018 | Thanigasalam |
| 2018/0114221 A1 | 4/2018 | Karantzis |
| 2018/0135815 A1 | 5/2018 | Rowles |
| 2018/0144615 A1 | 5/2018 | Kinney |
| 2018/0150622 A1 | 5/2018 | Zaitsev |
| 2018/0167816 A1 | 6/2018 | Kusens et al. |
| 2018/0189160 A1 | 7/2018 | Yasin |
| 2018/0189161 A1 | 7/2018 | Yasin |
| 2018/0248865 A1 | 8/2018 | Johansson |
| 2018/0285879 A1* | 10/2018 | Gadnis ............... G06Q 20/3223 |
| 2018/0302416 A1 | 10/2018 | Einberg |
| 2018/0329857 A1 | 11/2018 | Ko |
| 2018/0375848 A1 | 12/2018 | Tunnell |
| 2019/0103957 A1 | 4/2019 | Isobe |
| 2019/0122024 A1 | 4/2019 | Schwartz |
| 2019/0149333 A1 | 5/2019 | Harnik |
| 2019/0188111 A1 | 6/2019 | Ozog |
| 2019/0289017 A1 | 6/2019 | Agarwal |
| 2019/0207918 A1 | 7/2019 | Kurian |
| 2019/0245704 A1 | 8/2019 | Pala |
| 2019/0268774 A1 | 8/2019 | Kusens et al. |
| 2019/0271349 A1 | 9/2019 | Madru |
| 2019/0271578 A1 | 9/2019 | Moeller |
| 2019/0272495 A1 | 9/2019 | Moeller |
| 2019/0281025 A1 | 9/2019 | Harriman |
| 2019/0281036 A1 | 9/2019 | Eisen |
| 2019/0287427 A1 | 9/2019 | Schepers |
| 2019/0318122 A1 | 10/2019 | Hockey |
| 2019/0342092 A1 | 11/2019 | Handschuh |
| 2020/0042723 A1 | 2/2020 | Krishnamoorthy |
| 2020/0050745 A1 | 2/2020 | Kim |
| 2020/0053096 A1 | 2/2020 | Bendersky |
| 2020/0066071 A1 | 2/2020 | Budman |
| 2020/0097643 A1 | 3/2020 | Uzun |
| 2020/0099675 A1 | 3/2020 | Mardiks |
| 2020/0100115 A1 | 3/2020 | Skaaksrud |
| 2020/0120071 A1 | 4/2020 | Wimmer |
| 2020/0125704 A1 | 4/2020 | Chavez |
| 2020/0127974 A1 | 4/2020 | Morlando |
| 2020/0134145 A1 | 4/2020 | Bapst |
| 2020/0162435 A1 | 5/2020 | Kubo |
| 2020/0175157 A1 | 6/2020 | Wilding |
| 2020/0193051 A1 | 6/2020 | Van Antwerp |
| 2020/0358787 A1 | 11/2020 | Barker |
| 2020/0403787 A1 | 12/2020 | Islam |
| 2020/0403992 A1 | 12/2020 | Huffman |
| 2021/0014314 A1 | 1/2021 | Yamada |
| 2021/0049032 A1 | 2/2021 | White |
| 2021/0051177 A1 | 2/2021 | White |
| 2021/0123835 A1 | 4/2021 | Glennon |
| 2021/0152417 A1 | 5/2021 | Baird |
| 2021/0152554 A1 | 5/2021 | Taft |
| 2021/0173906 A1 | 6/2021 | Keith, Jr. |
| 2021/0173907 A1 | 6/2021 | Keith, Jr. |
| 2021/0173914 A1 | 6/2021 | Keith, Jr. |
| 2021/0173915 A1 | 6/2021 | Keith, Jr. |
| 2021/0173949 A1 | 6/2021 | Keith, Jr. |
| 2021/0174333 A1 | 6/2021 | Keith, Jr. |
| 2021/0176064 A1 | 6/2021 | Keith, Jr. |
| 2021/0176066 A1 | 6/2021 | Keith, Jr. |
| 2021/0176218 A1 | 6/2021 | Keith, Jr. |
| 2021/0176223 A1 | 6/2021 | Falk |
| 2021/0176235 A1 | 6/2021 | Keith, Jr. |
| 2021/0176633 A1 | 6/2021 | Keith, Jr. |
| 2021/0194608 A1 | 6/2021 | Yao |
| 2021/0250759 A1 | 8/2021 | Ziv |
| 2021/0297258 A1 | 9/2021 | Keith, Jr. |
| 2021/0297448 A1 | 9/2021 | Keith, Jr. |
| 2021/0297455 A1 | 9/2021 | Keith, Jr. |
| 2021/0390537 A1 | 12/2021 | Budko et al. |
| 2022/0027447 A1 | 1/2022 | Keith, Jr. |
| 2022/0028200 A1 | 1/2022 | Keith, Jr. |
| 2022/0030022 A1 | 1/2022 | Keith, Jr. |
| 2022/0036905 A1 | 2/2022 | Keith, Jr. |
| 2022/0038895 A1 | 2/2022 | Keith, Jr. |
| 2022/0038897 A1 | 2/2022 | Liu |
| 2022/0043913 A1 | 2/2022 | Keith, Jr. |
| 2022/0045841 A1 | 2/2022 | Keith, Jr. |
| 2022/0092161 A1 | 3/2022 | Keith, Jr. |
| 2022/0092162 A1 | 3/2022 | Keith, Jr. |
| 2022/0092163 A1 | 3/2022 | Keith, Jr. |
| 2022/0092164 A1 | 3/2022 | Keith, Jr. |
| 2022/0092165 A1 | 3/2022 | Keith, Jr. |
| 2022/0093256 A1 | 3/2022 | Keith, Jr. et al. |
| 2022/0094545 A1 | 3/2022 | Islamov et al. |
| 2022/0094550 A1 | 3/2022 | Keith, Jr. |
| 2022/0108026 A1 | 4/2022 | Ortiz et al. |
| 2022/0130501 A1 | 4/2022 | Keith, Jr. et al. |
| 2022/0138300 A1 | 5/2022 | Manjunath et al. |
| 2022/0139546 A1 | 5/2022 | Manjunath et al. |
| 2022/0164424 A1 | 5/2022 | Keith, Jr. |
| 2022/0197985 A1 | 6/2022 | Keith, Jr. |
| 2022/0229888 A1 | 7/2022 | Keith, Jr. |
| 2022/0286966 A1 | 9/2022 | Zhao |
| 2022/0382844 A1 | 12/2022 | Keith, Jr. |
| 2022/0385458 A1 | 12/2022 | Keith, Jr. |
| 2022/0394023 A1 | 12/2022 | Keith, Jr. |
| 2022/0394464 A1 | 12/2022 | Keith, Jr. |
| 2022/0394465 A1 | 12/2022 | Keith, Jr. |
| 2023/0096233 A1 | 3/2023 | Islamov et al. |
| 2023/0106024 A1 | 4/2023 | Keith, Jr. |
| 2023/0107624 A1 | 4/2023 | Keith, Jr. |
| 2023/0114650 A1 | 4/2023 | Keith, Jr. |
| 2023/0116527 A1 | 4/2023 | Keith, Jr. et al. |
| 2023/0185896 A1 | 6/2023 | Keith, Jr. |
| 2023/0198766 A1 | 6/2023 | Keith, Jr. et al. |
| 2023/0198962 A1 | 6/2023 | Keith, Jr. |
| 2023/0254120 A1 | 8/2023 | Islamov |
| 2023/0254121 A1 | 8/2023 | Islamov |
| 2023/0254122 A1 | 8/2023 | Islamov |
| 2023/0267454 A1 | 8/2023 | Budko |

(56) References Cited

U.S. PATENT DOCUMENTS

| | | |
|---|---|---|
| 2023/0283602 A1 | 9/2023 | Keith, Jr. et al. |
| 2023/0289431 A1 | 9/2023 | Keith, Jr. |

FOREIGN PATENT DOCUMENTS

| | | | |
|---|---|---|---|
| EP | 3457344 A1 * | 3/2019 | ........... G06Q 20/085 |
| WO | 2016179433 A1 | 11/2016 | |
| WO | 20200065132 A1 | 4/2020 | |
| WO | 2020092542 A1 | 5/2020 | |
| WO | 2021119187 A1 | 7/2021 | |

OTHER PUBLICATIONS

Joppe W. Bos et al., "Post-quantum key exchange for the TLS protocol from the ring learning with errors problem", International Association for Cryptologic Research, vol. 20150316:235249, Mar. 17, 2015, pp. 1-28.

International Search Report mailed Aug. 11, 2016, for PCT Application No. PCT/US2016/031055, filed May 5, 2016, five pages.

International Search Report mailed Oct. 9, 2019, for PCT Application No. PCT/US2019/041871, filed Jul. 15, 2019, four pages.

Li et al., "Addressable Metasurfaces for Dynamic Holography and Optical Information Encryption", Jun. 15, 2018, http://advances.sciencemag.org/content/advances/4/6/eaar6768.full.pdf.

The International Search Report and Written Report for the International Application No. PCT/US2020/064099 dated Mar. 16, 2021.

Magoon, Owais, "iOS app." Behance, published Sep. 7, 2015 (Retrieved from the Internet Mar. 22, 2021). Internet URL: <https://www.behance.net/gallery/27383661/iOS-app> (Year: 2015).

Bywater Films. "Winkk: Emotion to Action." Vimeo, published Oct. 7, 2015 (Retrieved from the Internet Mar. 22, 2021). Internet URL: <https://vimeo.com/141695923> (Year:2015).

Schiff, Eli, "Unofficial Apple Icon Design Awards." Eli Schiff Blog, published Jan. 5, 2016 (Retrieved from the Internet Mar. 22, 2021), Internet URL: <www.elischiff.com/blog/2016/1/5/apple-icon-design-awards> (Year: 2016).

International Report on Patentability from International Application No. PCT/US2020/064099, mailed on Jun. 23, 2022, 7 pages.

* cited by examiner

METHOD AND APPARATUS FOR ELECTRONIC TRANSACTIONS USING PERSONAL COMPUTING DEVICES AND PROXY SERVICES

FIELD OF THE INVENTION

The present invention relates to security. More specifically, the present invention relates to a security architecture.

BACKGROUND OF THE INVENTION

Although the Internet provides a massive opportunity for shared knowledge, it also enables those with malicious intentions to attack such as by stealing personal data or causing interference with properly functioning mechanisms. The Internet and other networks will continue to grow both in size and functionality, and with such growth, security will be paramount.

SUMMARY OF THE INVENTION

A security platform architecture is described herein. The security platform architecture includes multiple layers and utilizes a combination of encryption and other security features to generate a secure environment.

DETAILED DESCRIPTION OF THE PREFERRED EMBODIMENT

A security platform architecture is described herein. The security platform architecture includes multiple layers and utilizes a combination of encryption and other security features to generate a secure environment.

Figure 1:
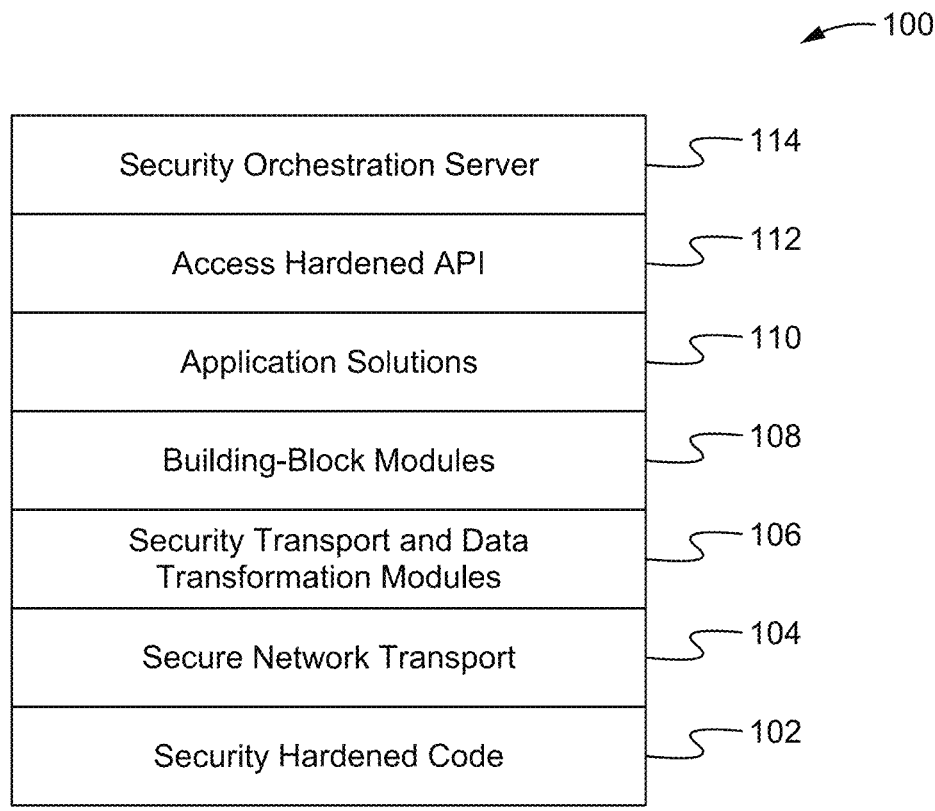
FIG. 1 illustrates a diagram of a security platform architecture according to some embodiments.

FIG. 1 illustrates a diagram of a security platform architecture according to some embodiments. The security platform 100 includes security-hardened code 102, secure network transport 104, security transport and data transformation modules 106, building block modules 108, application solutions/modules 110, access-hardened API/SDK 112, and a security orchestration server 114. In some embodiments, fewer or additional layers are implemented.

The security-hardened code 102 is able to include open or proprietary software security hardening. The security-hardened code 102 includes software libraries, executables, scripts, modules, drivers, and/or any other executable, accessible or callable data.

In some embodiments, the security-hardened code 102 is encrypted. For example, each library, executable and other data is encrypted. Furthering the example, an "encryption at rest" or "data at rest" encryption implementation is utilized. Data at rest encryption means data that is not in transit in a network or data that is not being executed is encrypted. Any data at rest encryption is able to be implemented including quantum encryption.

In some embodiments, the security-hardened code 102 is signed. For example, a digitally signed driver is associated with a digital certificate which enables identification of the publisher/owner of the driver.

In some embodiments, open or proprietary verification is based on encryption/decryption (e.g., the software modules/executables are inside an encrypted container), and is performed at installation and prior to each access. The security-hardened code 102 is fully tamper-proof. To be able to access the security-hardened code 102, a caller (e.g., calling module/procedure) should be part of the security domain.

In some embodiments, runtime verification of each executable, library, driver and/or data is implemented. Runtime verification is able to include any type of analysis of activity such as determining and learning keystrokes per user, or other mannerisms of computer interaction by each user.

In some embodiments, a security callback implementation is utilized. Before data is accessed or executed, the security callback calls to a master/server from the client, and if the hash or other verification implementation on the master/server does not match the hash/verification on the client, then access to the security-hardened code 102 is restricted/denied. For example, if a hash match fails, a software module will not be able to be executed, launched, moved or another action. The hash/verification comparison/analysis occurs before access of the security-hardened code 102. The security callback implementation is able to protect against instances where a virus or other malicious code has infiltrated a client device (e.g., mobile phone, personal computer).

The security-hardened code 102 is able to use any individual security technology or any combination of security technologies.

The security-hardened code 102 is able to be stored in a secure vault. The contents of the vault are encrypted using the data at rest encryption scheme. The contents of the vault are also signed. In some embodiments, white noise encryption is implemented which involves the use of white noise in the encryption. For example, white noise is generated using shift registers and randomizers, and the white noise is incorporated in the encryption such that if someone were to decrypt the content, they would obtain white noise.

The secure network transport 104 is able to be a high-speed, low-overhead, encrypted channel. In some embodiments, the secure network transport 104 uses quantum encryption (or post-quantum encryption). Quantum encryption is based on real keys (e.g., real numbers instead of integers) such that the encryption may not be hackable. Quantum encryption such as described in U.S. Provisional patent Application No. 62/698,644, filed on Jul. 16, 2018, titled: "SECRET MATERIAL EXCHANGE AND AUTHENTICATION CRYPTOGRAPHY OPERATIONS," and PCT Application No. PCT/US2019/041871, filed on Jul. 15, 2019, titled: "SECRET MATERIAL EXCHANGE AND AUTHENTICATION CRYPTOGRAPHY OPERATIONS," which are both incorporated by reference herein in their entireties for all purposes, is able to be utilized herein.

In some embodiments, everything that communicates uses the secure network transport 104. For example, when a software module communicates with another software module, information is sent using the secure network transport 104.

The secure network transport 104 is able to utilize a proprietary or open Internet key exchange, Trusted Platform Module (TPM) key processing and storage, IoT key exchange, and/or optical/sonic/infrared/Bluetooth® key exchange.

The security transport and data transformation modules 106 implement "data in motion" encryption and "data at rest" encryption. In some embodiments, encryption is implemented while the data is being accessed/executed. The security transport and data transformation modules 110 include a tunneling module to tunnel the implementation inside Secure Sockets Layer (SSL)/Transport Layer Security (TLS) to enable the data to be utilized on any platform/browser/software/hardware/standard. The tunneling is able to be TLS quantum tunneling. The security transport and data transformation modules 106 include Application Programming Interfaces (APIs), keys, Public Key Infrastructure (PKI) modules, and/or other modules/structures.

The building block modules 108 include processes, services, microservices such as: AUTH, TRANS, LOG, ETRANS, BLUETOOTH, ULTRASONIC, and/or RF, which are implemented using objects (including functions or sub-routines). The building block modules 108 come from the software code/libraries and are able to communicate via the secure network transport 104.

The building block modules 108 are able to communicate between each other. In some embodiments, the module to module communications utilize Qrist encryption transport (or another encryption scheme) which isolates the modules from threats of hacks, viruses and other malicious entities. Qrist transport is high performance and low latency which requires almost no overhead. Since the building block modules 108 are pulled from the encrypted code/libraries, they are not typically visible in memory.

The building block modules 108 also have layered APIs (e.g., a specific API to communicate amongst each other). The APIs enable additional flexibility and extendability as well as providing a firewall (or micro-firewall) between every service to ensure transactions are coming from the right place (e.g., no man in the middle), the correct data is involved, and so on. The communications between the building block modules 108 are also able to be over HTTP. For example, a Web Application Firewall (WAF) is utilized, which applies specific rules for HTTP application communications.

The building block modules 108 are able to include executables (.exe), dynamic link libraries (.dll), configuration information, or other types of data/files (e.g., .so). The building block modules 108 are able to run in the background as background processes. The building block modules 108 are able to communicate through encrypted communications. The encrypted communications go through a transport such as Internet Protocol (IP), encrypted pipes in memory, Bluetooth® or another implementation. As described herein, the services are wrapped in APIs. The APIs implement REST (e.g., a very thin web server/client).

The application solutions/modules 110 are able to be developed using the building block modules 108. Exemplary applications include: encrypted email attachments, CyberEye multi-factor authentication, ID proofing, secure document signing (e.g., Docusign), secure electronic transactions, smart machines (e.g., autonomous vehicles), SAAS login, OpenVPN, blockchain login, blockchain support, high performance transaction services, electronic locks and E-notary. For example, since Docusign is relatively unsecure (e.g., anyone can sign the document), by combining Docusign with a CyberEye multi-factor authentication or another identification technology, it is possible to increase the security such that only the intended person is able to sign the document. More specifically, data at rest encryption is utilized to ensure the document is secure while stored, and the multi-factor authentication is used to ensure that the person signing the document is the desired target, and data in motion encryption is used to ensure the signed document is not tampered with and is received at the correct location.

The application solutions/modules 110 are able to be run/executed on any computing device such as a smart phone, a personal computer, a laptop, a tablet computer, a server, a dedicated smart device, a computer workstation, a server, a mainframe computer, a handheld computer, a personal digital assistant, a cellular/mobile telephone, a smart appliance, a gaming console, a digital camera, a digital camcorder, a camera phone, a portable music player, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle), IoT devices or any other suitable computing device.

The access-hardened API/SDK 112 includes similar security (e.g., encryption) as in the other modules. The access-hardened API/SDK 112 is able to utilize REST or another API (e.g., RPC). By implementing the access-hardened API/SDK 112, communication with the outside world is facilitated. For example, using a scripting language (e.g., javascript), an external application is able to communicate with the system.

The security orchestration server 114 is/includes a scripting language where when a call is received, the process goes down through the stacks starting at the top until the software library/code is reached (e.g., 114 through 102), and then the process goes up through the stacks out through the top (e.g., 102 through 114). Although the language is exposed to the outside world, it is based on the hardened code 102, so it is still secure.

The security orchestration server 114 accesses the security-hardened code 102 in the secure vault. The security orchestration server 114 includes keys and other information used for accessing the security-hardened code 102. The security orchestration server 114 deploys the services, builds keys, assigns commands/tasks and performs other control features. In some embodiments, the security orchestration server 114 organizes the building block modules 108 such that they are able to communicate with each other and function as an application 110.

When the security orchestration server 114 launches an application 110 (comprised of the building block modules 108), the security orchestration server 114 retrieves .dlls or other data and executes/communicates with the application 110 through the APIs of the building block modules 108.

The security orchestration server 114 controls deployment, policies and app structure. The app structure is also referred to as the application solutions/modules 110 which includes the code, the different modules/objects, and any data involved. The policies are able to be any policies such as for the firewall—what ports are open, which APIs are able to run in/with the application, who/what/when/where, well-structure calls (size of packets, and more), ports/ACL, and partners (which partners have access).

The secure orchestration server 114 implements a secure language such as python with extensions, java, and/or javascript.

In an example, a copy program is implemented by sending a copy command via the API which triggers a copy module which uses the transport scheme including data at rest encryption and data in motion encryption, and then goes to the transport layer and performs encryption/decryption, handles key exchanges and the copying using the code modules for copying.

Figure 2:
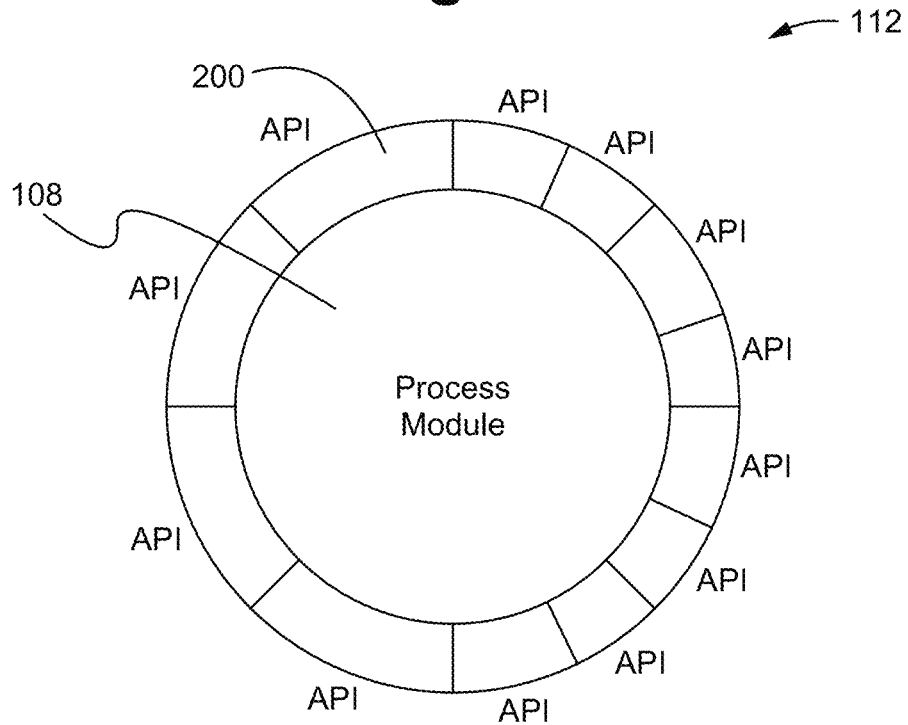
FIG. 2 illustrates an exemplary access-hardened API according to some embodiments.

FIG. 2 illustrates an exemplary access-hardened API according to some embodiments. The building block modules 108 enable communications and actions which are handled via RESTful APIs. Additionally, APIs 200 include Web Application Firewall (WAF) features to ensure that any communication between the building block modules 108 is secure/protected.

Figure 3:
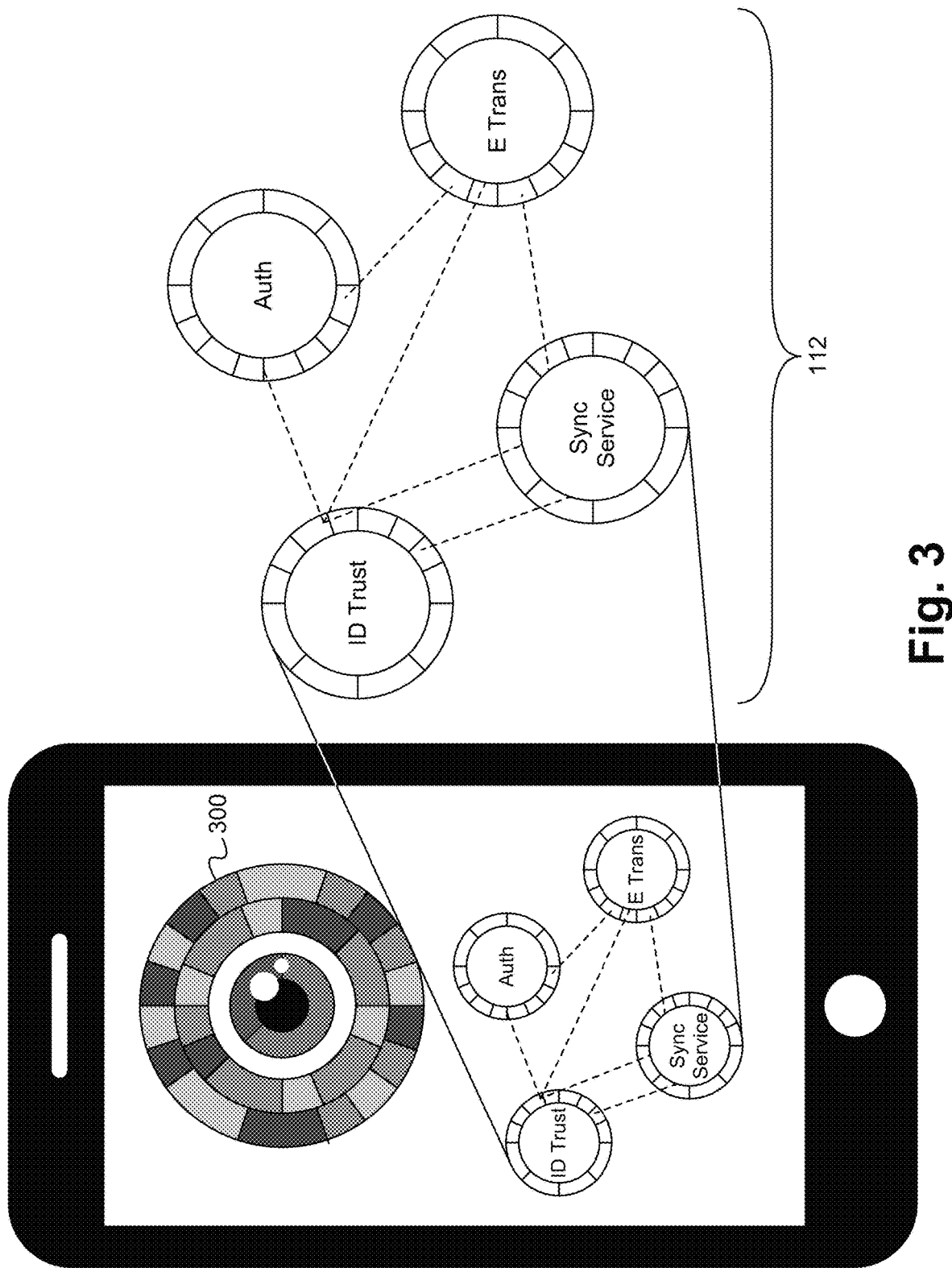
FIG. 3 illustrates a diagram of a secure application architecture according to some embodiments.

FIG. 3 illustrates a diagram of a secure application architecture according to some embodiments. An exemplary CyberEye implementation is able to be used to perform opti-crypto wireless airgap access (somewhat similar to a QR code). The building block modules 108 hardened by APIs 200 form the hardened APIs 112 which enable a modular services design, where each module is generalized for use in multiple application solutions. As described, the modules communicate with each other using encrypted communications (e.g., HTTP secure protocol). An API/WAF firewall is embedded in each module.

Figure 4:
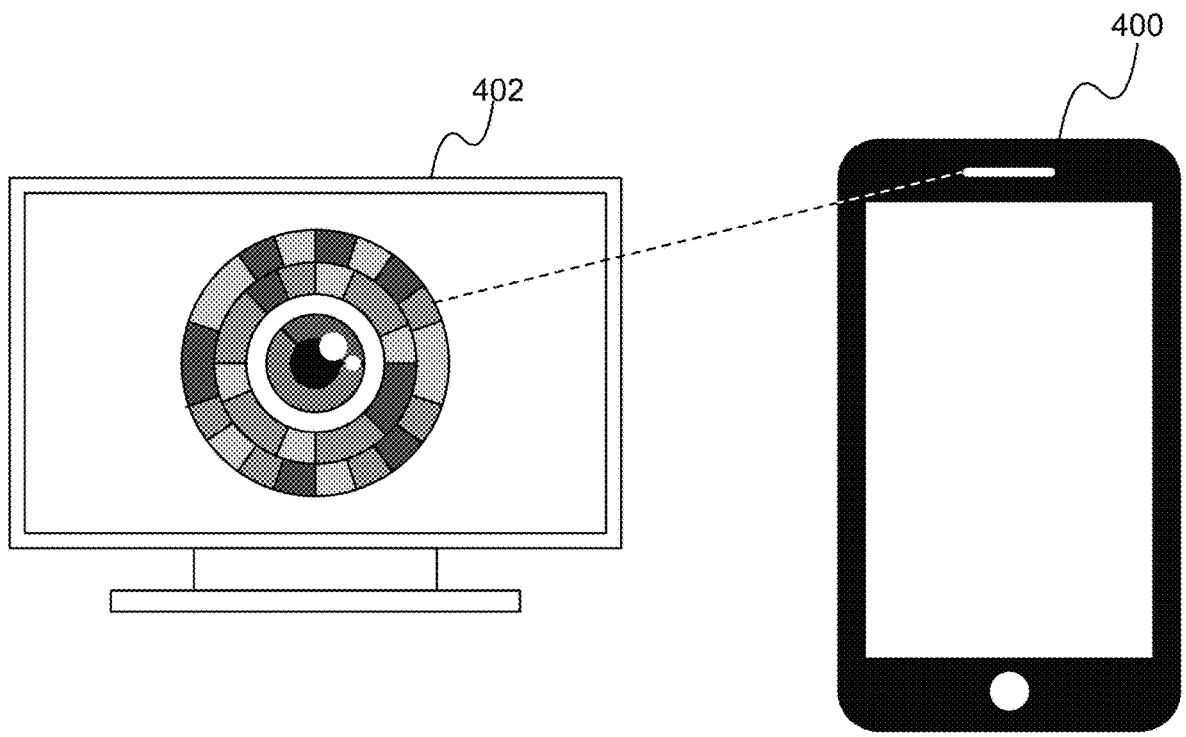
FIG. 4 illustrates a diagram of a smart device and a CyberEye multi-factor authentication according to some embodiments.

FIG. 4 illustrates a diagram of a smart device and a CyberEye multi-factor authentication according to some embodiments. As described in U.S. patent application Ser. No. 15/147,786, filed on May 5, 2016, titled: "Palette-based Optical Recognition Code Generators and Decoders" and U.S. patent application Ser. No. 15/721,899, filed on Sep. 30, 2017, titled: "AUTHENTICATION AND PERSONAL DATA SHARING FOR PARTNER SERVICES USING OUT-OF-BAND OPTICAL MARK RECOGNITION," which are incorporated by reference herein in their entireties for all purposes, a smart device 400 (e.g., smart phone) is able to utilize an application (and camera) on the smart device 400 to scan a CyberEye optical recognition code mark displayed on another device 402 (e.g., personal computer or second smart device) to perform multi-factor authentication. As described herein, the CyberEye multi-factor authentication is an application module which is composed of building block modules which transport data securely using a secure network transport, where the building block modules are composed of software code which is securely stored and accessed on the smart device 400. The CyberEye multi-factor authentication is an example of an application executable using the security platform architecture.

Figure 5:
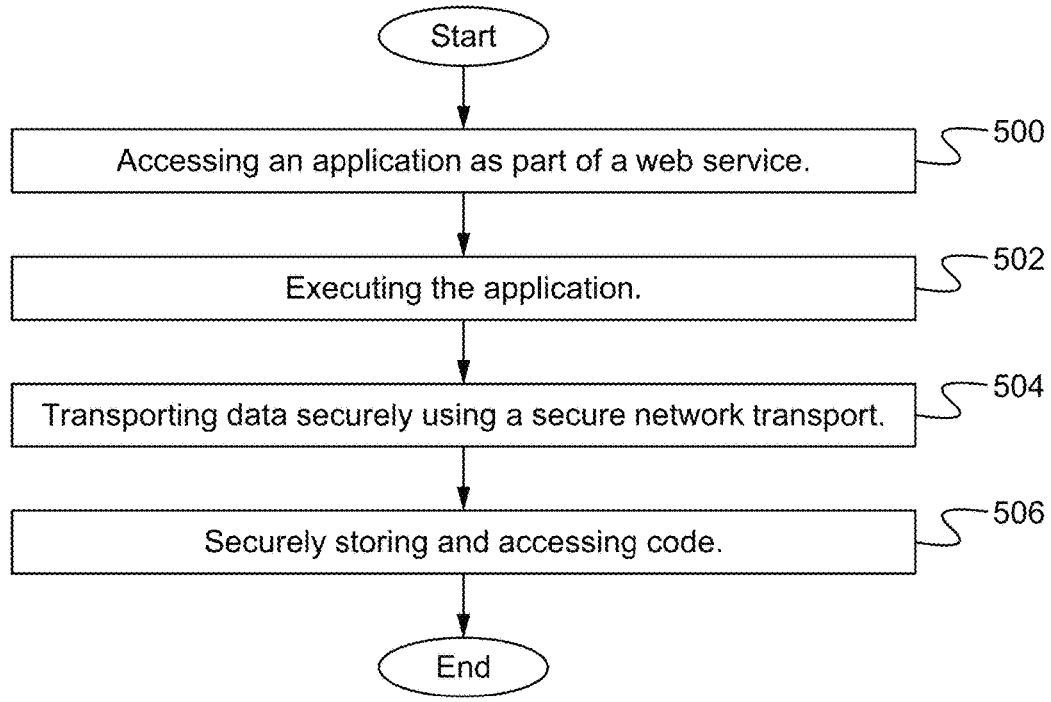
FIG. 5 illustrates a flowchart of a method of implementing a security platform architecture according to some embodiments.

FIG. 5 illustrates a flowchart of a method of implementing a security platform architecture according to some embodiments. In the step 500, an application is accessed as part of a web service such that a security orchestration server or access-hardened API is used to access the application. In the step 502, the application is executed. The application is composed of building block modules which transport data securely using a secure network transport, in the step 504. The building block modules are composed of software code which is securely stored and accessed on a device, in the step 506. Secure access involves data at rest encryption/decryption as well as data in motion encryption/decryption. In some embodiments, encryption/decryption involves quantum encryption/decryption using real numbers. In some embodiments, transporting the data includes utilizing tunneling such that the data is secure but also able to be transmitted over standard protocols. In some embodiments, fewer or additional steps are implemented. For example, in some embodiments, the application is a standalone application not accessed as part of a web service. In some embodiments, the order of the steps is modified.

Figure 6:
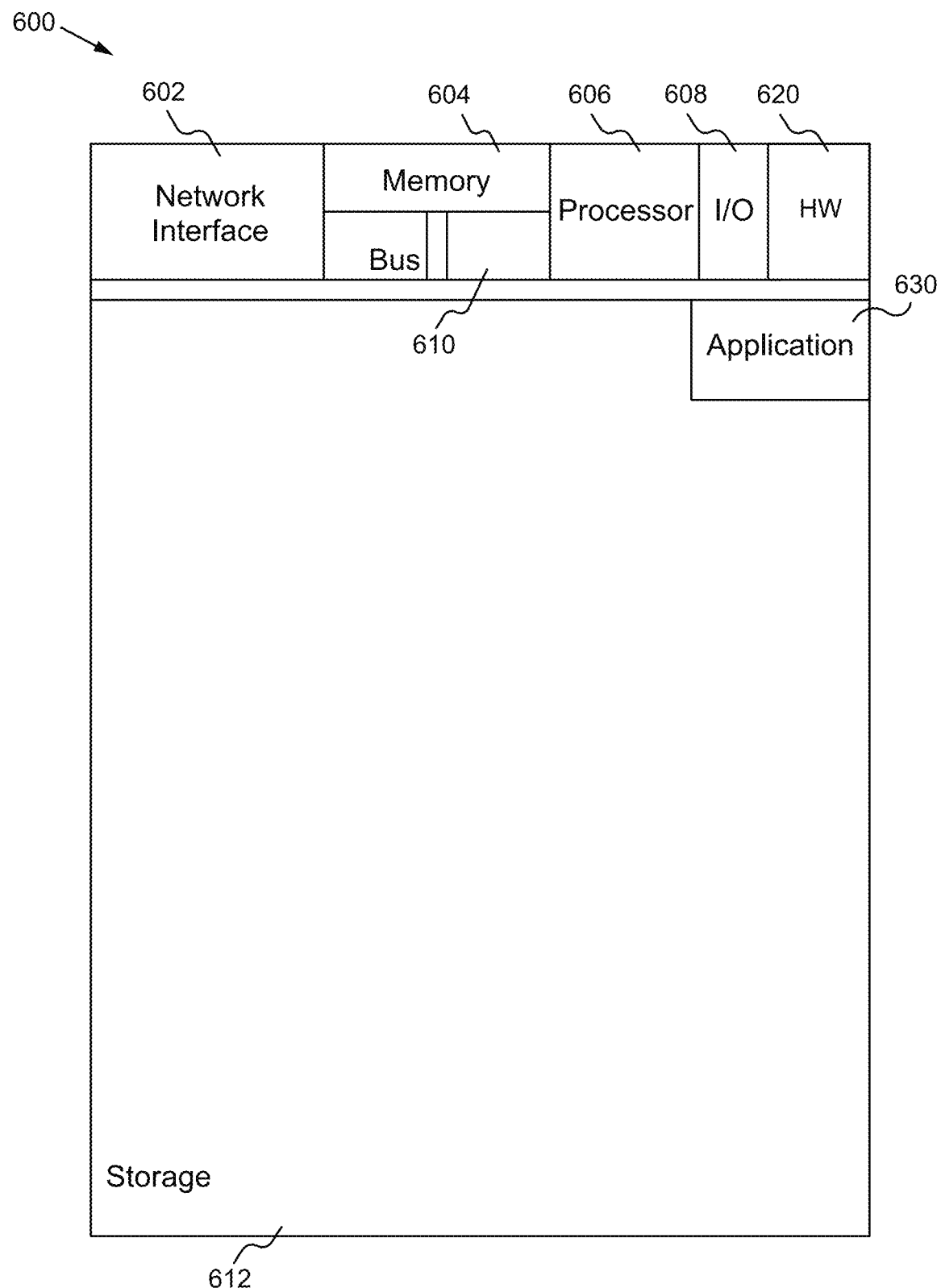
FIG. 6 illustrates a block diagram of an exemplary computing device configured to implement the security platform architecture according to some embodiments.

FIG. 6 illustrates a block diagram of an exemplary computing device configured to implement the security platform architecture according to some embodiments. The computing device 600 is able to be used to acquire, store, compute, process, communicate and/or display information. The computing device 600 is able to implement any of the security platform architecture aspects. In general, a hardware structure suitable for implementing the computing device 600 includes a network interface 602, a memory 604, a processor 606, I/O device(s) 608, a bus 610 and a storage device 612. The choice of processor is not critical as long as a suitable processor with sufficient speed is chosen. The memory 604 is able to be any conventional computer memory known in the art. The storage device 612 is able to include a hard drive, CDROM, CDRW, DVD, DVDRW, High Definition disc/drive, ultra-HD drive, flash memory card or any other storage device. The computing device 600 is able to include one or more network interfaces 602. An example of a network interface includes a network card connected to an Ethernet or other type of LAN. The I/O device(s) 608 are able to include one or more of the following: keyboard, mouse, monitor, screen, printer, modem, touchscreen, button interface and other devices. Security platform architecture application(s) 630 used to implement the security platform architecture are likely to be stored in the storage device 612 and memory 604 and processed as applications are typically processed. More or fewer components shown in FIG. 6 are able to be included in the computing device 600. In some embodiments, security platform architecture hardware 620 is included. Although the computing device 600 in FIG. 6 includes applications 630 and hardware 620 for the security platform architecture, the security platform architecture is able to be implemented on a computing device in hardware, firmware, software or any combination thereof. For example, in some embodiments, the security platform architecture applications 630 are programmed in a memory and executed using a processor. In another example, in some embodiments, the security platform architecture hardware

620 is programmed hardware logic including gates specifically designed to implement the security platform architecture.

In some embodiments, the security platform architecture application(s) 630 include several applications and/or modules. In some embodiments, modules include one or more sub-modules as well. In some embodiments, fewer or additional modules are able to be included.

In some embodiments, the security platform architecture hardware 620 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle), IoT devices or any other suitable computing device.

Figure 7:
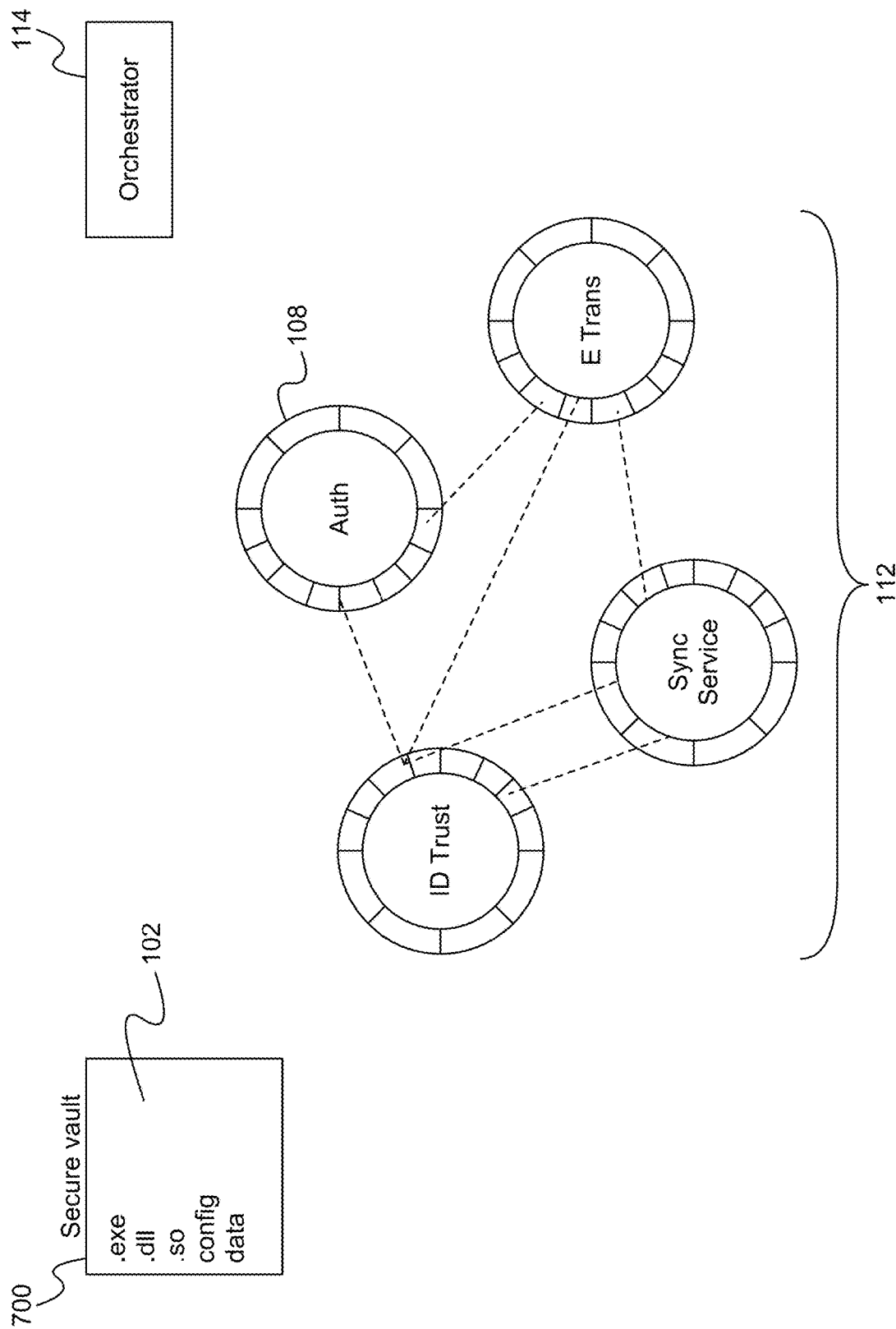
FIG. 7 illustrates a diagram of a secure application framework and platform according to some embodiments.

FIG. 7 illustrates a diagram of a secure application framework and platform according to some embodiments. The secure application framework and platform includes: a secure vault 700, a secure orchestration server 114 (also referred to as an orchestrator), and a set of building block modules 108 which form an application implemented via an access-hardened API 112. As described herein, the secure vault 700 stores the code 102 using encryption (e.g., white noise encryption) and signing, where the code 102 is used to generate/form the building block modules 108 which when organized form an application. The secure orchestration server 114 is able to control access to the code, deploy services, control one or more policies, and organize the one or more building block modules. Additional or fewer components are able to be included in the secure application framework and platform.

Figure 8:
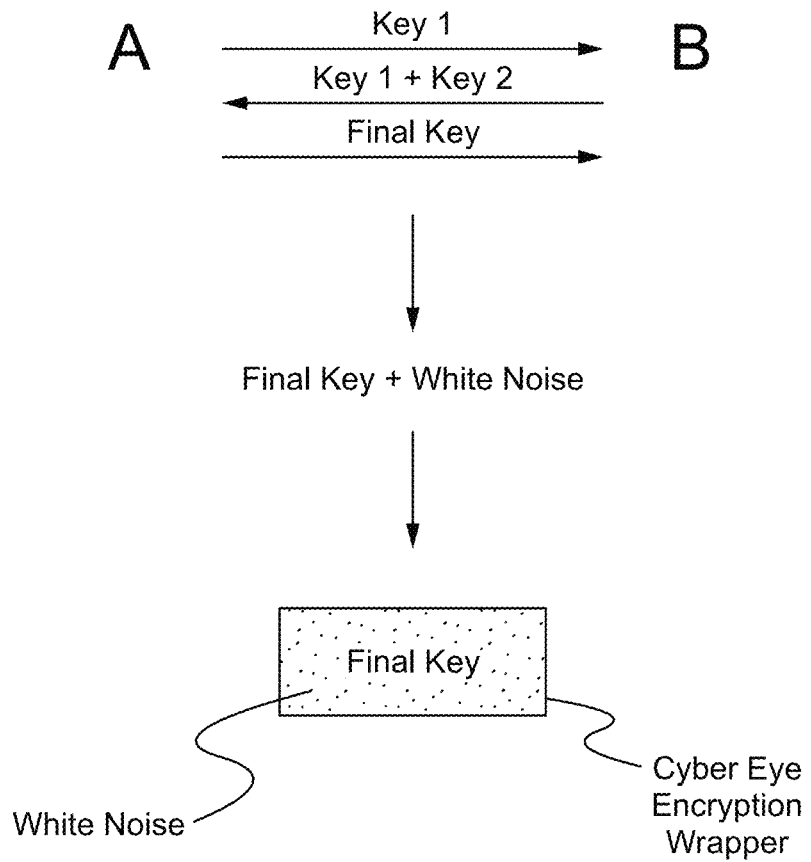
FIG. 8 illustrates a diagram of a secure key exchange through an opti-encryption channel according to some embodiments.

FIG. 8 illustrates a diagram of a secure key exchange through an opti-encryption channel according to some embodiments. Device A sends a first key to Device B, and Device B sends the first key and a second key back to Device A. Then Device A sends a final key to Device B, where the final key is based on the first key and the second key. In some embodiments, the final key is computed using the first key and the second key and one or more equations (e.g., linear equations). In some embodiments, white noise is inserted into the final key, or the final key is wrapped in white noise. In some embodiments, the keys are real numbers instead of integers.

In some embodiments, the final key is protected by optical encryption. As described herein, a user uses a camera device such as a camera on a mobile phone or tablet to scan/acquire a dynamic optical mark (e.g., CyberEye mark). The CyberEye result is wrapped around the final key. In some embodiments, the final key (with white noise) is encrypted/wrapped using the CyberEye encryption (or other opti-crypto wireless airgap encryption) information. In some embodiments, the opti-crypto key wrapper is a key encapsulation algorithm. In some embodiments, the optical encryption is used to generate the key. For example, the CyberEye result is a key or the final key which is combined with white noise.

Once the keys are passed, an encrypted communication/channel is able to be established (e.g., AES). In some embodiments, the encryption used is polymorphic, meaning the keys for the packets continuously change. In some embodiments, the encryption utilized with the encrypted communication/channel is post quantum encryption which enables quantum resistant encryption.

In some embodiments, a user's computing device is able to be used as a secure identification (e.g., ID proofing). The computing device is able to have a TPM or similar device/implementation for securing certificates. The TPM or similar implementation has break-in detection and other security measures. The computing device also includes machine learning implementations (processors/microchips). The computing device is able to include other standard components such as a CPU, one or more cameras, a screen, communication modules (e.g., Bluetooth,® WiFi, 5G, xG), and others.

ID proofing is able to prove/guarantee a user is who they claim to be. Instead of or in addition to biometric identification (e.g., fingerprint matching) and facial/voice recognition, other aspects of a user or a user's actions are able to be analyzed (e.g., behavior analysis). For example, a user's gate/stride, how the user uses his device, how the user types/swipes, and other motions/actions/transactions are able to be analyzed, compared and matched to determine if the user is the expected/appropriate user. Furthering the example, if a user typically takes short strides while using the phone and uses two thumbs to input text, then when a second user attempts to use the phone but has longer strides and uses a single finger input, then the device is able to detect that the person using the device is not the expected user (e.g., owner of the mobile phone).

A trust score is able to be generated based on the analysis. For example, as more matches are made (e.g., valid biometric input, matching stride, and matching typing performance, the trust score increases). Policies are able to implemented based on the trust score. For example, one or more thresholds are able to be utilized such that if the trust score is below a threshold, then options are limited for that user. Furthering the example, if a user has a 100% trust score, then there are no limitations on the user's use of the device, but if the user has a 50% trust score, below a money threshold, then the user is not able to perform any transactions involving money with the device, and if the user has a 5% trust score, the user is not able to access any applications of the device. Any number of thresholds are able to be used, and any limitations/consequences are able to be implemented based on the thresholds/trust score. The orchestrator described herein is able to implement these policies. In some embodiments, a risk score is implemented which is similar but inverse of the trust score.

In some embodiments, a transaction proxy is implemented. The transaction proxy is able to utilize the trust score to determine which transactions are allowed. The transactions are able to include any transactions such as logging in to a web site/social media, accessing an application (local/online), purchasing goods/services, transferring money, opening a door, starting a car, signing a document or any other transaction. In some embodiments, if a user's trust score is currently below a threshold, the device is able to perform additional tests of the user to increase their trust score (e.g., ask the user to say a word to determine a voice match). Passwords and personal information are able to be stored locally on the device (or on the Internet/cloud) for retrieval for access/comparison purposes. As described herein, the data (e.g., passwords and personal information) are able to be encrypted and backed up. For example, if the device is lost, the backup enables a user to purchase another device and retrieve all of the passwords/personal information.

In some embodiments, the implementation is or includes an extensible transaction method. For example, the device includes an application with a list of transactions (e.g., plug-ins). Once a transaction is initiated (e.g., Facebook login where Facebook password is pulled from the TPM), the transaction with all of the required information is stored as an encrypted file which is sent to a secure server proxy which is able to decrypt the file and then make the transaction. Since the transaction is able to occur using a proxy, the user is able to remain anonymous. In some embodiments, the opti-encryption implementation is able to be utilized with the secure identification implementation.

Figure 9:
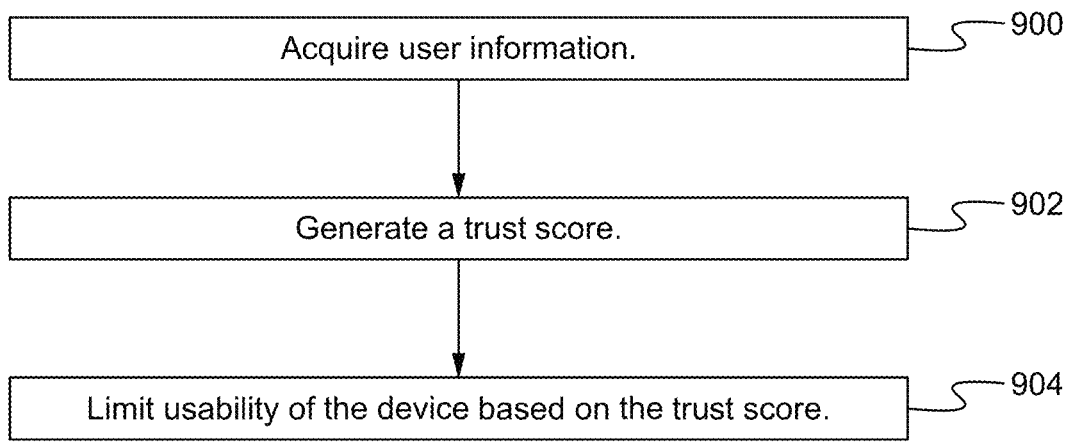
FIG. 9 illustrates a flowchart of a method of utilizing a user device as identification according to some embodiments.

FIG. 9 illustrates a flowchart of a method of utilizing a user device as identification according to some embodiments. In the step 900, user information is acquired. The user information is able to be acquired in any manner such as receiving and logging keystrokes/touches from a keyboard/digital keypad/touch screen, measuring movement using an accelerometer or other device in a mobile device, acquiring imaging information using a camera (e.g., camera phone), acquiring voice information using a microphone, and/or any other implementation described herein.

In the step 902, a trust score is generated. The trust score is generated by analyzing the acquired user information. For example, an application records (and learns) how a user types, and compares how the current input with previous input to determine similarities. Similarly, the application is able to analyze a user's stride (long, short, fast, slow) by capturing the data over periods of time for comparison purposes. The trust score is also able to be based on other information such as location, time, device information and other personal information. For example, if the device is determined to be in Mexico, and the user has never visited Mexico previously, the trust score is able to be decreased. Or if the device is being used at 3 a, when the user does not use the device after 10 p or before 6 a, then the trust score is decreased.

In the step 904, usability of the device is limited based on the trust score. For example, if the trust score is below a minimum threshold, the user may be prevented from doing anything on the device. In another example, if the user's trust score is determined to be below an upper threshold, the user may be permitted to utilize apps such as gaming apps, but is not able to use the device to make purchases, sign documents or login to social media accounts. In some embodiments, actions/transactions are classified into classes or levels, and the classes/levels correspond to ranges of trust scores or being above or below specified thresholds. For example, purchases of $10 or more and signing documents are in Class 1, and Class 1 actions are only available when a trust score is 99% or above, and purchases below $10 and social media logins are in Class 2, and Class 2 actions are available when a trust score is 80% or above.

In some embodiments, fewer or additional steps are implemented. For example, if a user's trust score is below a threshold for an action that the user wants to take, the device is able to request additional proof by the user (e.g., provide a fingerprint and/or input a secret code) to increase the user's trust score. In some embodiments, the order of the steps is modified.

Figure 10:
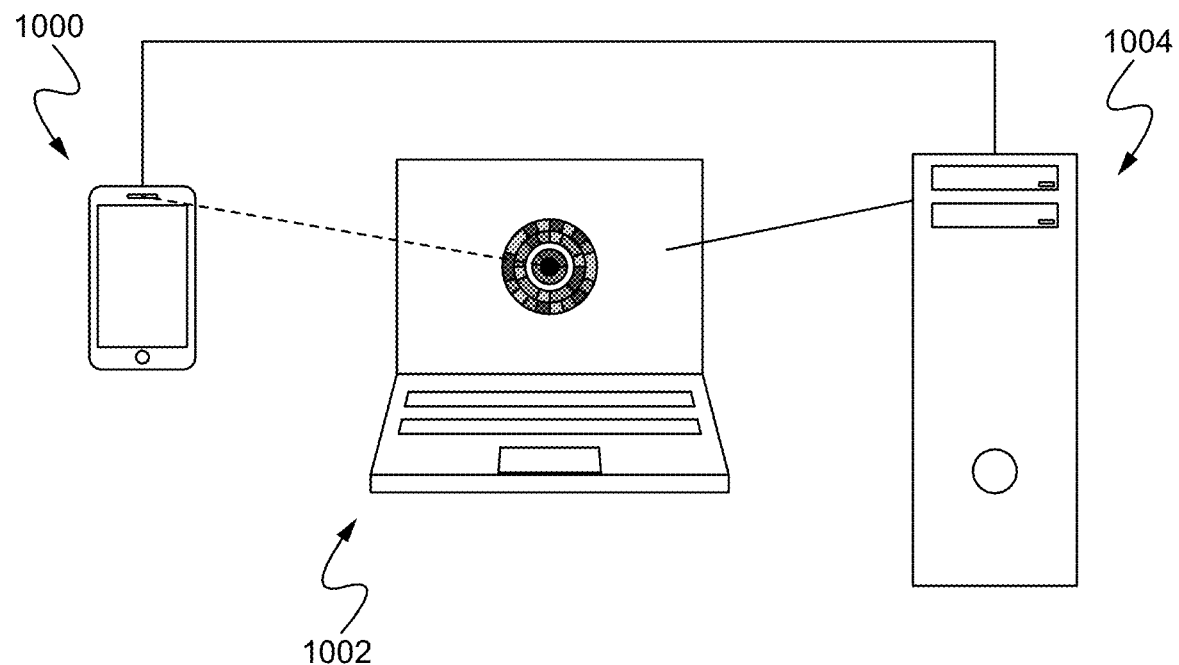
FIG. 10 illustrates a diagram of an optical encryption implementation according to some embodiments.

FIG. 10 illustrates a diagram of an optical encryption implementation according to some embodiments. As described herein, a device 1000 (e.g., smart phone) includes a camera which is able to acquire an image of a CyberEye implementation (e.g., repeating pattern) displayed in a web browser on another device 1002 (e.g., personal computer). The web browser is able to come from a server 1004 (e.g., local server). The server is able to provide authentication. There is also a back channel from the server to the device 1000. As described herein, the device 1000 is able to be used as a user's ID.

Figure 11:
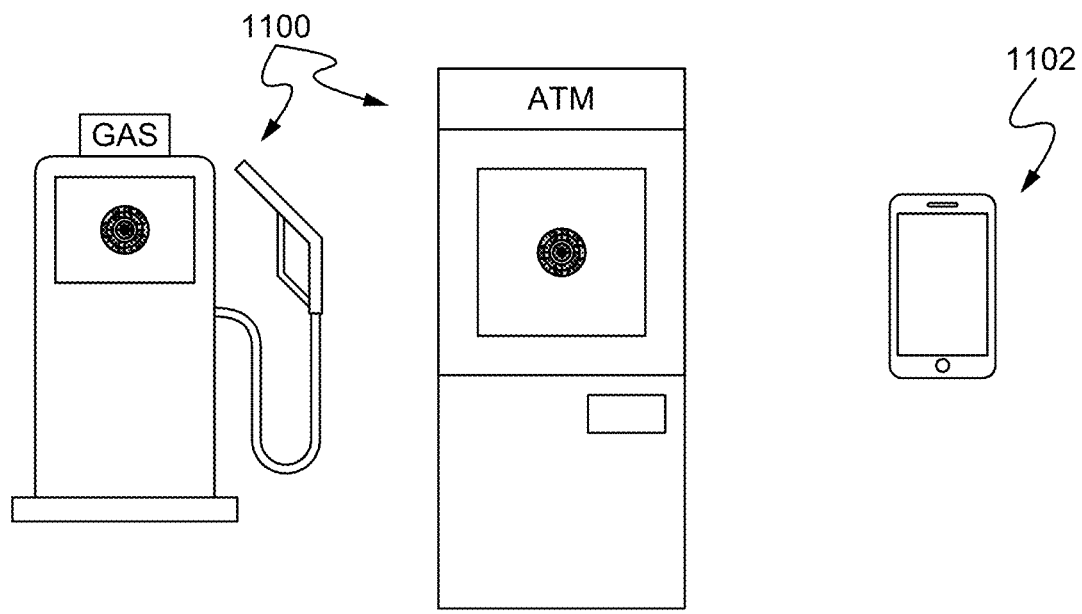
FIG. 11 illustrates a diagram of an optical encryption implementation on multiple devices according to some embodiments.

FIG. 11 illustrates a diagram of an optical encryption implementation on multiple devices according to some embodiments. The CyberEye implementation (or other optical multi-factor authentication) is able to be implemented on a gas station pump, Automated Teller Machine (ATM) machine, or any other device capable of displaying a multi-factor authentication implementation. For example, the gas station pump or ATM includes a display which is capable of displaying a web browser with a CyberEye implementation. The user is then able to use his mobile device to scan/acquire an image of the CyberEye, and then based on the ID proofing described herein, the user's device is able to authenticate payment or perform other transactions with the gas station pump, ATM or other device.

Figure 12:
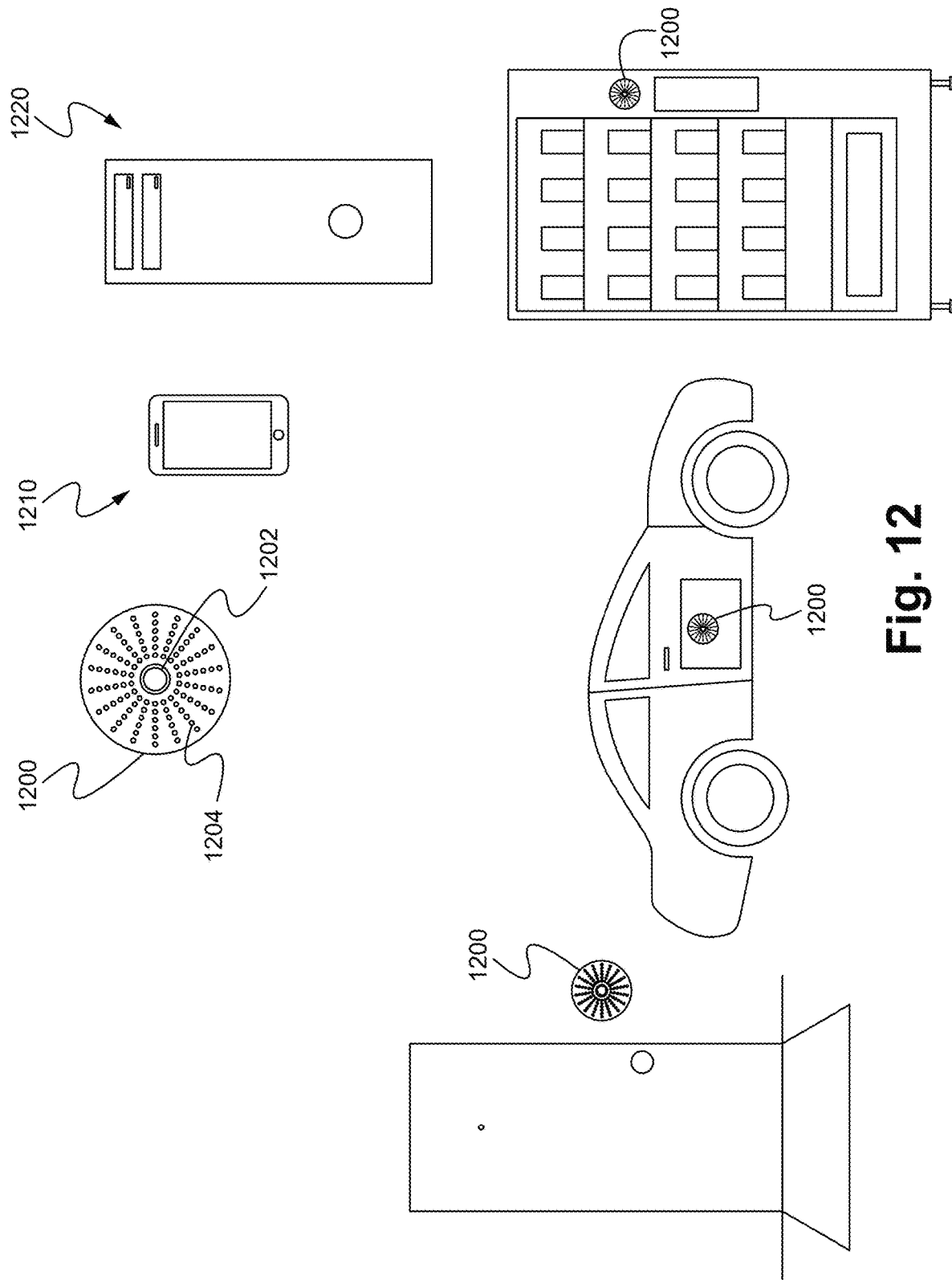
FIG. 12 illustrates a diagram of an optical encryption implementation on multiple devices according to some embodiments.

FIG. 12 illustrates a diagram of an optical encryption implementation on multiple devices according to some embodiments. In some embodiments, instead of or in addition to implementing a display with a CyberEye (or similar) implementation an embedded electronic device 1200 is utilized. The embedded electronic device 1200 includes a camera 1202 and lights 1204 (e.g., LEDs). In addition, other standard or specialized computing components are able to be included such as a processor, memory and a communication device (e.g., to communicate with WiFi).

In some embodiments, the embedded electronic device 1200 illuminates/flashes the lights 1204 in a specific pattern which a user device 1210 (e.g., smart phone) is able to scan/capture (similar to the CyberEye implementation). For example, upon the user device 1210 scanning the pattern provided by the embedded electronic device 1200, the user device 1210 (or the embedded electronic device 1200) sends an encrypted communication to perform a transaction. In some embodiments, a server 1220 determines (based on stored policies as described herein) whether the user's trust score is above a threshold to perform the transaction. For example, the user device 1210 is able to be used to unlock a house door, open a car door or purchase items at a vending machine. Furthering the example, in an encrypted communication to the server 1220 based on the scan of the embedded electronic device 1200, a transaction request to open the front door is sent to the server 1220 (either by the embedded electronic device 1200 or the user device 1210). The server 1220 compares the trust score with policies (e.g., if trust score is 99% or above, then unlock the lock; otherwise, no operation), and performs or rejects the requested transaction. For example, the server 1220 sends a communication to the embedded electronic device 1200 to unlock the lock of the door. The communication is able to be sent to a local or remote server for authentication which then communicates to the specific device (e.g., house door lock), or the communication is sent directly to the specific device (e.g., peer-to-peer communication). In some embodiments, the embedded electronic device 1200 sends the communication to a local or remote server for authentication, and then upon receiving authentication, the embedded electronic device 1200 performs the transaction. In some embodiments, the embedded electronic device 1200 communicates with the server (e.g., communicates the transaction request), and the user device 1210 communicates with the server (e.g., the user ID/trust score), and the server uses the information received from both devices to perform an action or to send a communication to perform an action, as described herein.

Figure 13:
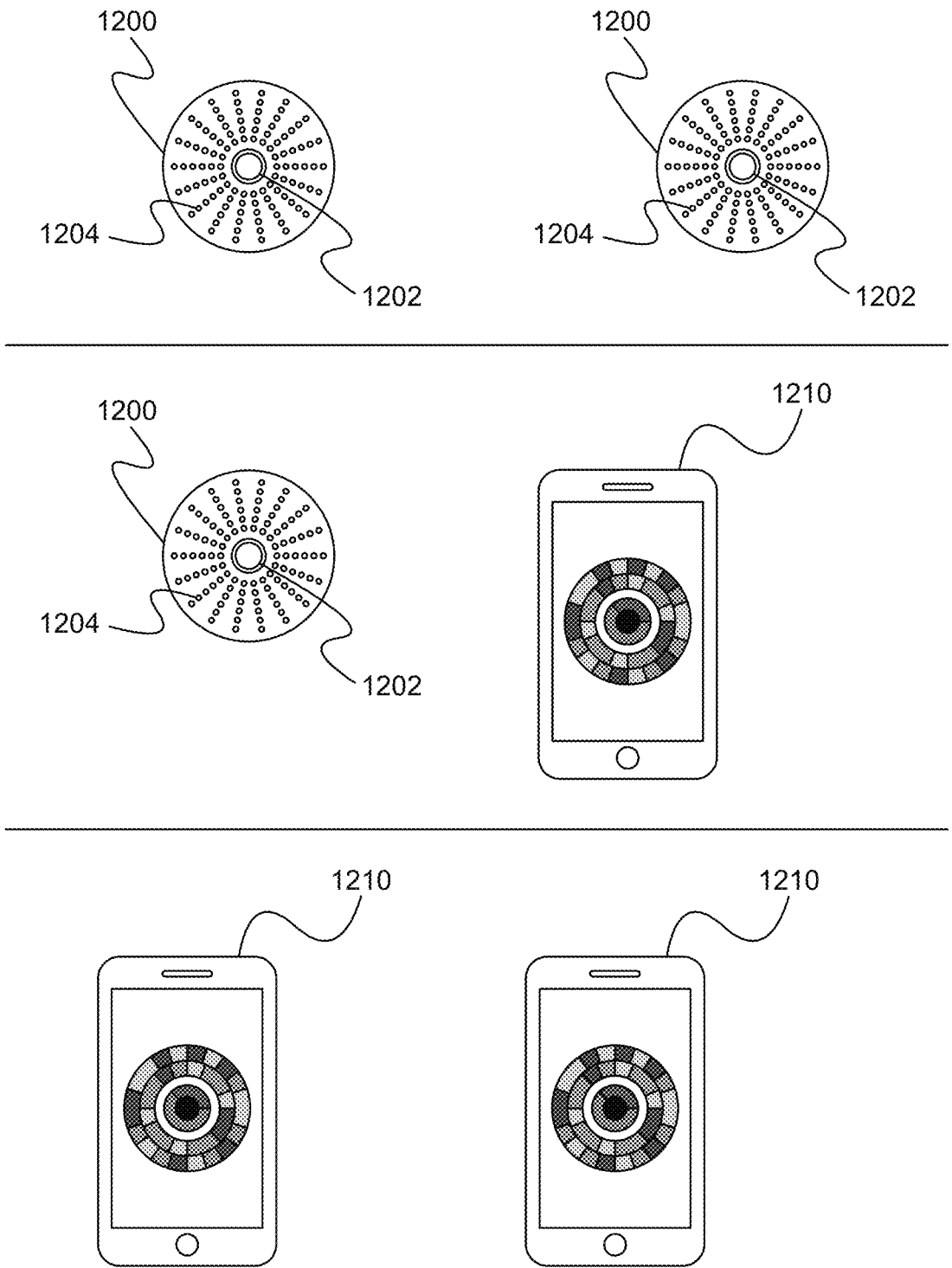
FIG. 13 illustrates a diagram of multiple embedded electronic devices and/or other devices according to some embodiments.

FIG. 13 illustrates a diagram of multiple embedded electronic devices and/or other devices according to some embodiments. In some embodiments, an embedded electronic device 1200 is able to communicate with one or more embedded electronic devices 1200. In some embodiments, an embedded electronic device 1200 is able to communicate with one or more other devices (e.g., user device 1210). In some embodiments, a user device 1210 is able to communicate with one or more other devices (e.g., user device 1210).

Since the embedded electronic device 1200 includes a camera 1202 and LEDs 1204, and a user device 1210 (e.g., mobile phone) includes a camera and a display to display a CyberEye (or similar) implementation, each is able to be used to display and acquire a unique code.

The multiple devices are able to communicate with each other and/or with a server. For example, a first user device is able to communicate with a second user device, and the second user device communicates with a server, and then provides the data received from the server to the first user device. Therefore, in some embodiments, the first user device (or embedded electronic device) does not need a connection with the server.

In some embodiments, the user device is able to replace a car key fob, since the user device is able to perform ID proofing as described herein, and is able to communicate with an embedded electronic device (e.g., a vehicle door lock/other vehicle controls). Similarly, with minimal modification, a car key fob is able to implement the technology described herein.

In some embodiments, instead of using optics for encryption (e.g., scanning a CyberEye implementation), other schemes are used such as infra-red, Bluetooth®, RFID, sonic, ultrasonics, laser, or RF/WiFi.

Figure 14:
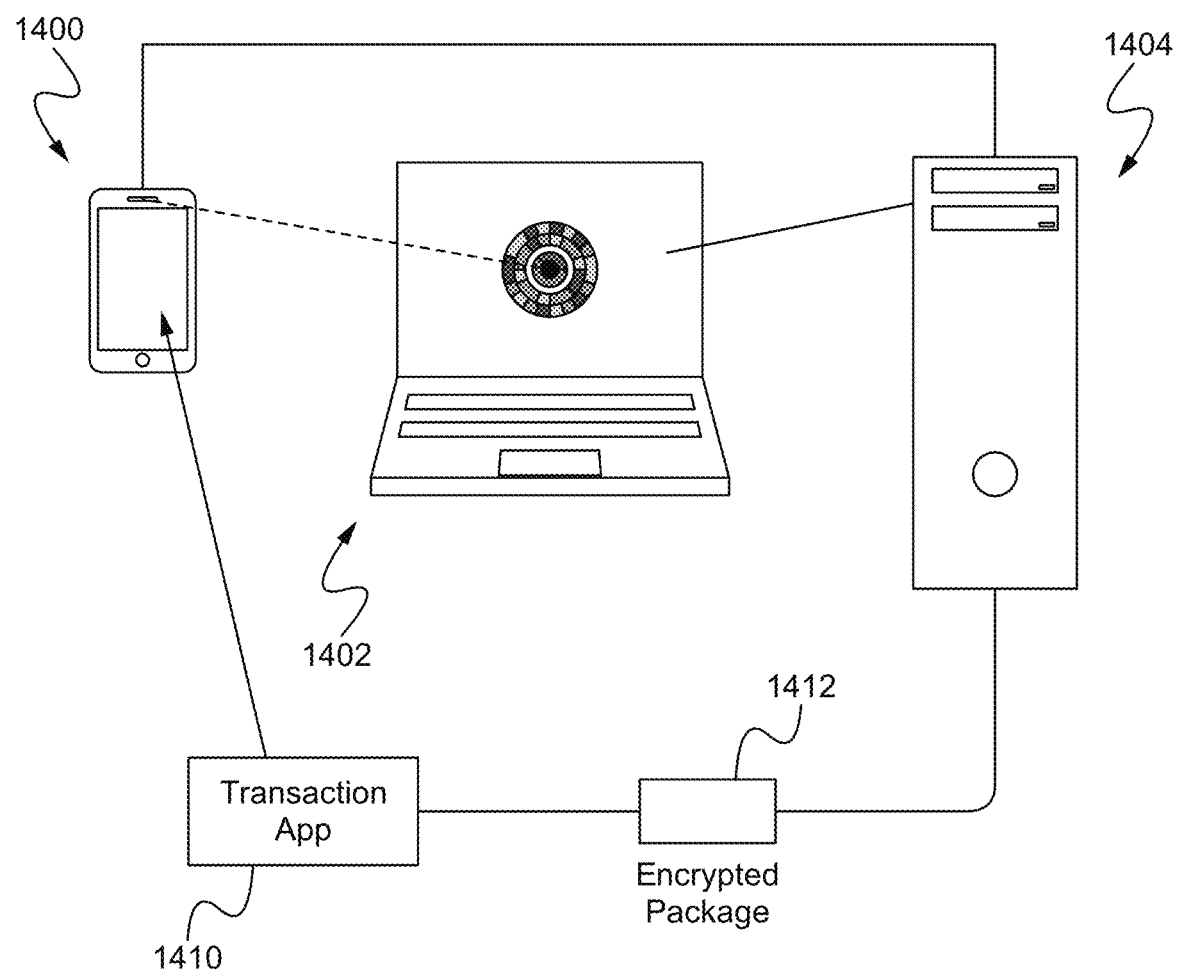
FIG. 14 illustrates a diagram of a system for electronic transactions using personal computing devices and proxy services according to some embodiments.

FIG. 14 illustrates a diagram of a system for electronic transactions using personal computing devices and proxy services according to some embodiments. A user device 1400 (e.g., smart phone) scans a CyberEye or similar implementation on a second device 1402 (e.g., personal computer or mobile device). The user device 1400 and/or the second device 1402 are able to communicate with a server 1404.

In some embodiments, the user device 1400 includes a transaction application 1410 programmed in memory. The transaction application 1410 is configured to send an encrypted package 1412 to the server 1404 based on the scan of the CyberEye or similar implementation (e.g., dynamic optical mark/code). The transaction application 1410 is able to trigger actions such as log in to a social media site, log in to a bank account, perform a monetary transfer, and/or any other transaction.

The server 1404 implements a proxy to perform the electronic transactions such as authentication, unlock door, moving money, e-signature and/or any other transaction. The transactions available through the transaction application 1410 are also added to the server 1404, such that the number of transactions is extensible. As described herein, the transactions are able to be accompanied by a trust or risk score such that if the trust/risk score is above or below a threshold (depending on how implemented), then the transaction request may be denied. By using the proxy to perform the electronic transactions, a user's anonymity and security is able to be maintained. With a transaction directly from a user device 1400, there is still potential for eavesdropping. However, as mentioned above, the transaction application 1410 sends an encrypted package/packet (e.g., token), which includes the transaction information (e.g., transaction ID, phone ID, trust score, specific transaction details such as how much money to transfer) to the server, where the proxy performs the transaction. The proxy server has secure connections to banks, Paypal, social networking sites, and other cloud servers/services. Furthermore, in some embodiments, the proxy server communication does not specify details about the user. In some embodiments, after the proxy server performs the transaction, information is sent to the user device. In some embodiments, the information sent to the user device is encrypted. For example, after the proxy server logs in to Facebook, the Facebook user page is opened on the user device.

In an example, a user receives a document to sign on the second device 1402. The user clicks the document icon to open the document, which then causes a CyberEye mark to appear. The user then scans the CyberEye mark with the user device 1400 which performs the ID proofing/authentication as described herein. The document is then opened, and it is known that the person who opened the document is the correct person. Similarly, the document is able to be signed using the CyberEye mark or a similar implementation to ensure the person signing the document is the correct person.

As described herein, a user device (e.g., mobile phone) is able to be used for ID proofing, where the user device recognizes a user based on various actions/input/behavioral/usage patterns (e.g., voice/facial recognition, stride/gate, location, typing technique, and so on). In some embodiments, potential user changes are detected. For example, if a user logs in, but then puts the device down, another user may pick up the phone, and is not the original user. Therefore, actions/situations such as putting the phone down, handing the phone to someone else, leaving the phone somewhere are able to be detected. Detecting the actions/situations is able to be implemented in any manner such as using an accelerometer to determine that the phone is no longer moving which would indicate that it was put down. Similarly, sensors on the phone are able to determine that multiple hands are holding the phone which would indicate that the phone is being handed to someone else. In some embodiments, the user device is configured to determine if a user is under duress, and if the user is under duress, the trust score is able to be affected. For example, an accelerometer of the user device is able to be used to determine shaking/trembling, and a microphone of the device (in conjunction with a voice analysis application) is able to determine if the user's voice is different (e.g., shaky/trembling). In another example, the camera of the user device is able to detect additional people near the user and/or user device, and if the people are unrecognized or recognized as criminals (e.g., face analysis with cross-comparison of a criminal database), then the trust score drops significantly (e.g., to zero).

As discussed herein, when a user attempts to perform an action/transaction where the user's trust score is below a threshold, the user is able to be challenged which will raise the user's trust score. The challenge is able to be a behavioral challenge such as walking 10 feet so the user device is able to analyze the user's gate; typing a sentence to analyze the user's typing technique; or talking for 10 seconds or repeating a specific phrase. In some embodiments, the user device includes proximity detection, fingerprint analysis, and/or any other analysis.

In some embodiments, an intuition engine is developed and implemented. The intuition engine continuously monitors a user's behavior and analyzes aspects of the user as described herein. The intuition engine uses the learning to be able to identify the user and generate a trust score.

With 5G and future generation cellular networks, user devices and other devices are able to be connected and accessible at all times, to acquire and receive significant amounts of information. For example, user device locations, actions, purchases, autonomous vehicle movements, health information, and any other information are able to be tracked, analyzed and used for machine learning to generate a behavioral fingerprint/pattern for a user.

In some embodiments, when a user utilizes multiple user devices, the user devices are linked together such that the data collected is all organized for the user. For example, if a has a smart phone, a smart watch (including health monitor), and an autonomous vehicle, the data collected from each is able to be stored under the user's name, so that the user's heart beat and driving routes and stride are able to be used to develop a trust score for when the user uses any of these devices.

To utilize the security platform architecture, a device executes an application which is composed of building block modules which transport data securely using a secure network transport, where the building block modules are composed of software code which is securely stored and accessed on the device. In some embodiments, the application is accessed as part of a web service such that a security orchestration server or access-hardened API are used to access the application. The security platform architecture is able to be implemented with user assistance or automatically without user involvement.

In operation, the security platform architecture provides an extremely secure system capable of providing virtually tamper-proof applications.

The security platform architecture implements/enables: a unique Opti-crypto wireless airgap transport, a personal smart device—intelligent ID proofing, secure extensible electronic transaction framework, blockchain integration and functionality, anonymous authentication and transaction technology, post quantum encryption at rest and in motion, secure private key exchange technology, secure encryption tunneled in TLS, high-throughput, low-latency transport performance, low overhead transport for low power FOG computing applications such as IOT, RFID, and others.

The security platform architecture is able to be utilized with:
  Consumer applications such as games, communications, personal applications;
  Public Cloud Infrastructure such as SAAS front-end security, VM-VM, container-container security intercommunications;
  Private Cloud/Data Centers such as enhanced firewall, router, edge security systems;
  Telco Infrastructures such as CPE security, SDN encrypted tunnels, MEC edge security and transports, secure encrypted network slicing; and
  5G New Market Smart Technologies such as smart machine security (sobots, autonomous vehicles, medical equipment).

The security platform includes infrastructure building blocks:
Client Devices:
  smart personal devices, IoT devices, RFID sensors, embedded hardware, smart machines;
Client Functions:
  ID proofing (trust analysis), CyberEye wireless transport, extensible electronic transaction clients, content and data loss security management, authorization client;

Transport Functions:
  Post-quantum data encryption technology, data-in-motion transport, data-at rest encryption, quantum tunnel through SSL/TLS, private-private secure key exchange, high-performance, low latency, low compute transport, TPM key management, SSL inspection;
Central Server Functions:
  AAA services, federation gateway, electronic transactions server, adaptive authentication services, ID proofing services, user registration services, CyberEye transport server.

The security platform architecture is able to be used in business:
  5G encrypted network slicing, electronic stock trading, vending machine purchasing interface, vehicle lock and security interfaces, anonymous access applications, Fog computing security transport (IoT to IoT device communications), SSL inspection security (decryption zones), generic web site/web services login services, MEC (mobile/multi-access edge gateway transport and security), cloud network backbone security firewalls (rack to rack FW), Office 365 secure login, low power IoT sensors, password management with single sign-on, high-security infrastructures requiring out-of-band or air gap enhanced access, or VM-to-VM (or containers) secure communications transport.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method comprising:
  receiving an encrypted communication on a proxy server, wherein the encrypted communication is based on scanning a continuously changing dynamic optical mark, wherein the encrypted communication includes a trust score corresponding to a user, wherein the trust score is based on a plurality of physical interactions by the user with a mobile device; and
  performing a transaction with the proxy server based on the encrypted communication, wherein the proxy server is configured to hide an identity of the user.

2. The method of claim 1 wherein the mobile device scans the dynamic optical mark and the encrypted communication.

3. The method of claim 2 wherein the mobile device includes a transaction application programmed in a memory.

4. The method of claim 1 wherein performing the transaction with the proxy server is based on the trust score of the user, further wherein if the trust score of the user is below a threshold, then the transaction is not performed.

5. The method of claim 1 wherein the dynamic optical mark is displayed by an embedded electronic device.

6. The method of claim 5 wherein the embedded electronic device is positioned on/in a wall, car, or purchasing machine.

7. A server device comprising:
  a memory configured for storing an application, the application configured for:
    receiving an encrypted communication, wherein the encrypted communication is based on a scanned continuously changing dynamic optical mark, wherein the encrypted communication includes a trust score corresponding to a user, wherein the trust score is based on a plurality of physical interactions by the user with a mobile device, wherein the physical interactions include movements by the user;

analyzing the trust score of the user by comparing the trust score of the user with a threshold; and performing a transaction based on the encrypted communication when the trust score of the user is greater than the threshold; and a processor configured for processing the application.

8. The server device of claim 7 wherein the mobile device scans the dynamic optical mark and sends the encrypted communication.

9. The server device of claim 8 wherein the mobile device includes a transaction application programmed in a memory, wherein the transaction application sends a token which includes the transaction information including a transaction identification, a mobile device identification and the trust score.

10. The server device of claim 9 wherein performing the transaction is based on the trust score of the user, further wherein if the trust score of the user is below the threshold, then the transaction is not performed.

11. The server device of claim 7 wherein the scanned dynamic optical mark is displayed by an embedded electronic device.

12. The server device of claim 11 wherein the embedded electronic device is positioned on/in a wall, car, or purchasing machine.

13. A user device comprising:
a memory configured for storing an application, the application configured for:
scanning a dynamic optical mark;
sending an encrypted communication to a proxy server, wherein the encrypted communication is based on the continuously changing dynamic optical mark, wherein the encrypted communication includes a trust score corresponding to a user, wherein the trust score is based on a plurality of physical user interactions with the user device, wherein the plurality of physical user interactions are detected by one or more accelerometers of the user device, wherein the trust score authenticates the user for the user device, wherein the physical interactions include movements by the user; and
receiving information from the proxy server based on the proxy server performing a transaction based on the encrypted communication; and
a processor configured for processing the application.

14. The user device of claim 13 wherein performing the transaction is based on the trust score of the user, further wherein if the trust score of the user is below a threshold, then the transaction is not performed.

15. The user device of claim 13 wherein the dynamic optical mark is displayed by an embedded electronic device.

16. The user device of claim 15 wherein the embedded electronic device is positioned on/in a wall, car, or purchasing machine.

17. The user device of claim 13 wherein the dynamic optical mark comprises at least two concentric circles comprising a plurality of segments wherein each segment of the plurality of segments comprises one color of at least three different colors, wherein the application is further configured for calibrating the dynamic optical mark by comparing the at least three different colors to an encoding palette, wherein the application is further configured for generating the encrypted communication with the dynamic optical mark.

* * * * *